United States Patent
Mayer et al.

(10) Patent No.: US 7,200,989 B2
(45) Date of Patent: Apr. 10, 2007

(54) APPARATUS AND METHOD FOR CLEANING EXHAUST GAS FROM AN INTERNAL COMBUSTION ENGINE

(75) Inventors: Thorsten Mayer, Worms (DE); Heinrich Duetsch, Eberdingen (DE); Christian Walz, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/527,584

(22) PCT Filed: Sep. 25, 2003

(86) PCT No.: PCT/DE03/03196

§ 371 (c)(1), (2), (4) Date: Mar. 14, 2005

(87) PCT Pub. No.: WO2004/036005

PCT Pub. Date: Apr. 29, 2004

(65) Prior Publication Data
US 2006/0053773 A1    Mar. 16, 2006

(30) Foreign Application Priority Data
Oct. 15, 2002    (DE) .............................. 102 47 989

(51) Int. Cl.
*F01N 3/00* (2006.01)
(52) U.S. Cl. ............................ 60/286; 60/274; 60/295; 60/298; 60/301
(58) Field of Classification Search .................. 60/274, 60/286, 295, 301, 303, 302, 298; 422/170, 422/172, 176, 177, 182, 183
See application file for complete search history.

(56) References Cited

U.S. PATENT DOCUMENTS

| 5,412,946 | A  | * | 5/1995 | Oshima et al. ............... 60/286 |
| 5,611,198 | A  | * | 3/1997 | Lane et al. .................... 60/299 |
| 5,628,186 | A  | * | 5/1997 | Schmelz ....................... 60/274 |
| 6,173,568 | B1 | * | 1/2001 | Zurbig et al. ................. 60/274 |
| 6,200,535 | B1 |   | 3/2001 | Hartweg et al. |
| 6,293,096 | B1 | * | 9/2001 | Khair et al. .................. 60/286 |

(Continued)

FOREIGN PATENT DOCUMENTS

EP    1 022 048 A1    7/2000

(Continued)

OTHER PUBLICATIONS

Bunting A,:"Spinging the Trap", Automotive Engineer, Mechanical Engineering Publ. Ltd. Bury St. Edmunds, GB, Bd. 25, Nr.5 May 2000, S.73-74, XP000936087, ISSN:0307-6490.

*Primary Examiner*—Tu M. Nguyen
(74) *Attorney, Agent, or Firm*—Ronald E. Greigg

(57) ABSTRACT

An exhaust-gas cleaning system for cleaning the exhaust gas of an internal combustion engine with self ignition and/or with direct fuel injection has at least one oxidizing catalytic converter, disposed in an exhaust conduit of the engine, and has at least one device, disposed downstream of the oxidizing catalytic converter for the selective catalytic reduction of the exhaust gases. A delivery device integrated with the at least one oxidizing catalytic converter delivers a reducing agent into the exhaust-gas stream of the engine. A corresponding method for cleaning the exhaust gases of an internal combustion engine is also disclosed.

20 Claims, 4 Drawing Sheets

U.S. PATENT DOCUMENTS

| | | |
|---|---|---|
| 6,293,097 B1 * | 9/2001 | Wu et al. ............... 60/286 |
| 6,314,722 B1 | 11/2001 | Matros et al. |
| 6,401,455 B1 * | 6/2002 | Mathes et al. ............ 60/286 |
| 6,449,947 B1 * | 9/2002 | Liu et al. ............... 60/286 |
| 6,880,328 B2 * | 4/2005 | Daetz et al. ............ 60/285 |
| 2004/0187483 A1 * | 9/2004 | Dalla Betta et al. ...... 60/286 |
| 2005/0247048 A1 * | 11/2005 | Schaller et al. ............ 60/286 |

FOREIGN PATENT DOCUMENTS

| | | |
|---|---|---|
| EP | 1 174 599 A1 | 1/2002 |
| JP | 7-100335 | 4/1995 |

* cited by examiner

APPARATUS AND METHOD FOR CLEANING EXHAUST GAS FROM AN INTERNAL COMBUSTION ENGINE

CROSS-REFERENCE TO RELATED APPLICATIONS

This application is a 35 USC 371 application of PCT/DE 03/03196 filed on Sep. 25, 2003.

BACKGROUND OF THE INVENTION

1. Field of the Invention

The invention relates to an exhaust-gas cleaning system of an internal combustion engine, having a device for selective catalytic reduction. The invention also relates to a method for cleaning exhaust gases of internal combustion engine, in which an exhaust-gas stream is carried through a device for selective catalytic reduction.

2. Prior Art

To reduce the nitrogen oxide components in oxygen-rich exhaust gas, of the kind emitted especially by Diesel engines and by direct gasoline injection engines, it is known to introduce a reducing agent into an exhaust gas stream. $NH_3$, for instance, is suitable as a reducing agent and can be introduced in the form of gas into the exhaust-gas stream. In this selective catalytic reduction (SCR), the ammonia, along with the nitrogen oxides contained in the exhaust gas, is selectively converted into molecular nitrogen and water. Because of its toxicity, however, pure ammonia gas is unsuitable for use in the motor vehicle. One known method provides for the use of aqueous urea solution as a reducing agent. In that case, the actual reducing agent, ammonia, is not released until after thermolysis and ensuing catalyzed hydrolysis of the urea.

The known SCR systems have inadequate activity at exhaust gas temperatures below about 250° C. Connecting an oxidizing catalytic converter to the upstream end assures a reduction in the proportion of hydrocarbons, which have a deactivating effect, on the one hand and an oxidation of NO into $NO_2$ on the other, the overall result being a marked increase in the conversion of $NO_x$ at exhaust gas temperatures above about 200° C. Below about 180° C., because of the relatively long decomposition time of urea to $NH_3$, the system offers only inadequate activity. Particularly in use in the passenger car, however, phases with such low exhaust gas temperatures are relatively frequent, as is clearly demonstrated by a mean catalytic converter temperature of less than 180° C. in the so-called MVEG test cycle.

To assure good distribution of the reducing agent in the SCR catalytic converter, a mixing distance of approximately 40 cm, optionally provided with a mixing device, may be provided. Such a mixing device for an exhaust-gas cleaning system is described in the earlier German Patent Application, Serial No. 101 31 803.0. In it, a mixing body disposed in the exhaust gas tube has a gas impact face as well as a stream impact face, so that exhaust gas flowing out of the engine can strike the gas impact face, and reducing agent which can be delivered transversely to the exhaust-gas stream can strike the stream impact face.

SUMMARY AND ADVANTAGES OF THE INVENTION

In an exhaust-gas cleaning system for cleaning the exhaust gas of an internal combustion engine, at least one oxidizing catalytic converter, disposed in an exhaust conduit of the engine, and at least one device, disposed downstream of the oxidizing catalytic converter, for selective catalytic reduction (SCR catalytic converter) are provided. According to the invention, a delivery device integrated with the at least one oxidizing catalytic converter is provided for delivering a reducing agent into the exhaust-gas stream of the engine. With the exhaust-gas cleaning system of the invention, relatively oxygen-rich exhaust gases from Diesel engines or from gasoline engines with direct fuel injection can in particular be effectively cleaned of nitrogen oxides ($NO_x$). With the aid of the invention, it is possible to reduce the structural length of the exhaust-gas cleaning system markedly, while at the same time good conversion of the reducing agent in the exhaust-gas stream is assured. The mixing distance of approximately 40 cm that is typically necessary for good distribution of the reducing agent on the SCR catalytic converter can be reduced markedly, without causing an unwanted pressure drop in the system. Because of the omission of the typically required long mixing distance, the SCR catalytic converter need not necessarily be installed in the region under the floor of the vehicle; instead, it can be shifted closer to the exhaust gas outlet from the engine. In this way, a more-favorable course of the temperature in the exhaust-gas cleaning system is obtained, which advantageously affects the cleaning action.

One embodiment of the invention provides that the delivery device has a nozzle for atomizing the reducing agent. The introduction of the reducing agent through the nozzle is preferably effected directly into the oxidizing catalytic converter. For this purpose, recessing or drilling out of the oxidizing catalytic converter is necessary, since the reducing agent should if at all possible not come into contact with the oxidizing catalytic converter; otherwise, unwanted oxidation can occur, creating molecular nitrogen, nitrogen dioxide, or nitrogen monoxide.

One embodiment of the invention provides a mixing device, downstream of the delivery device, for better distribution of the reducing agent in the exhaust-gas stream. In this way, even more-thorough mixing of the reducing agent with the exhaust-gas stream can be achieved, and hence an even better cleaning action of the exhaust gas in the downstream SCR catalytic converter.

The output of the nozzle may selectively be disposed approximately centrally or eccentrically in the oxidizing catalytic converter. Eccentric introduction through the nozzle can be done for instance with a lateral swirl, so that good thorough mixing with the exhaust-gas stream is nevertheless assured. If the use of catalytic converters near the engine is not possible, or if the reduction in HC and CO emissions is inadequate, the oxidizing catalytic converter can be recessed selectively not over its full length but only downstream of the introduction point. Thus even without an oxidizing catalytic converter near the engine, the hydrocarbons and carbon monoxides are adequately oxidized. In addition, the thermal preparation of the reducing agent profits from exothermia at the oxidizing catalytic converter, which occurs as a result of the oxidation of the hydrocarbons and carbon monoxides.

One embodiment of the invention provides that the at least one oxidizing catalytic converter, with the delivery device integrated with it, has a first housing; and that the device for selective catalytic reduction has a second housing adjoining the first. Between the two housings, a connecting tube is preferably provided, which may have a different length depending on the peripheral structural conditions in the vehicle. Preferably, however, the connecting tube is embodied as being as short as possible, in order as much as possible to prevent the exhaust-gas stream from cooling down before reaching the device for selective catalytic reduction. The cleaning action of the SCR catalytic converter does not achieve satisfactory orders of magnitude until temperatures of about 300° C.

An alternative embodiment provides that the at least one oxidizing catalytic converter and the device for selective catalytic reduction have a common housing. As a result, it is assured that the exhaust-gas stream, acted upon by reducing agent, has an ideal temperature for the conversion and $NO_x$ reduction in the SCR catalytic converter. The structural unit of the two components assures a compact design and a favorable exhaust-gas cleaning action overall.

A preferred embodiment of the invention provides that upstream of the at least one oxidizing catalytic converter in the exhaust-gas stream of the engine, at least one further oxidizing catalytic converter is disposed. Preferably, the at least one further oxidizing catalytic converter is disposed in the immediate vicinity of the combustion chambers of the engine and can for instance comprise one further oxidizing catalytic converter each at each exhaust gas outlet from each combustion chamber of the engine. In this way, the SCR catalytic converter can be largely protected against becoming coated with hydrocarbons and carbon monoxide. The additional oxidizing catalytic converters near the engine, which can also be called cylinder-head or preturbocharger catalytic converters, assure extensive conversion of the hydrocarbons and carbon monoxide contained in the exhaust gas and thus markedly improve the cleaning action of the SCR catalytic converter.

The precatalytic converters may preferably be disposed upstream of an exhaust gas turbine of an exhaust-gas turbocharger.

Examples of substances that can be considered as the reducing agent are preferably all those substances that contain ammonia or split off ammonia, such as HWL, ammonia carbamate, ammonia gas, etc.

According to the invention, a method for cleaning exhaust gases of an internal combustion engine, in particular an internal combustion engine with self ignition and/or with direct fuel injection, in which an exhaust-gas stream is carried through at least one oxidizing catalytic converter disposed in the exhaust conduit and at least one source, downstream of the oxidizing catalytic converter, for selective catalytic reduction (SCR catalytic converter) provides that a reducing agent is delivered to the exhaust-gas stream inside the at least one oxidizing catalytic converter. By the introduction of the reducing agent through a nozzle at the beginning of the catalytic converter path, the mixing distance required until now is eliminated. Even without the mixing distance, optimal action on the downstream SCR catalytic converter is assured, since the reducing agent mixes ideally with the exhaust-gas stream because it passes through the two transition funnels of the exhaust gas system. It thus becomes possible to reduce the structural length of the system considerably and to heat the catalytic converters up faster. Also because of this, it becomes possible to install the SCR catalytic converter relatively near the engine, so that under some circumstances the catalytic converter can be accommodated in the engine compartment, and there is no need to install it in the region under the floor of the vehicle, a position that is less favorable for attaining a working temperature faster.

One embodiment of the invention provides that the delivery and/or atomization of the reducing agent is effected by means of a nozzle that is disposed approximately centrally or selectively eccentrically inside the oxidizing catalytic converter, and which assures a fine distribution of the reducing agent in the oxidizing catalytic converter. The preparation of the reducing agent is equivalent to an adjacent- or split-stream arrangement. The spray cone of the introduction through the nozzle can be kept substantially smaller than in previously known systems, which is advantageous for the sake of the reactions that take place in the catalytic converters. The nozzle introduction point is substantially closer to the engine, and as a result the reducing agent is better preconditioned for hydrolysis on the SCR catalytic converter. This can be of decisive significance particularly at low catalytic converter temperatures. Furthermore, given an optimal design, the structural size of the oxidizing catalytic converter becomes somewhat smaller because of the recessing of the metering point, and particularly at temperatures around 300° C. in combination with low exhaust gas speeds, the risk that high proportions of $NO_2$ will occur is reduced. Conversely, in cold starting or at low catalytic converter temperatures (low engine load), the somewhat smaller structural size has hardly any adverse effect on the proportion of $NO_2$.

BRIEF DESCRIPTION OF THE DRAWINGS

The invention will be described in further detail below in terms of preferred exemplary embodiments in conjunction with the associated drawings. Shown are.

DESCRIPTION OF THE PREFERRED EMBODIMENTS

Figure 1:
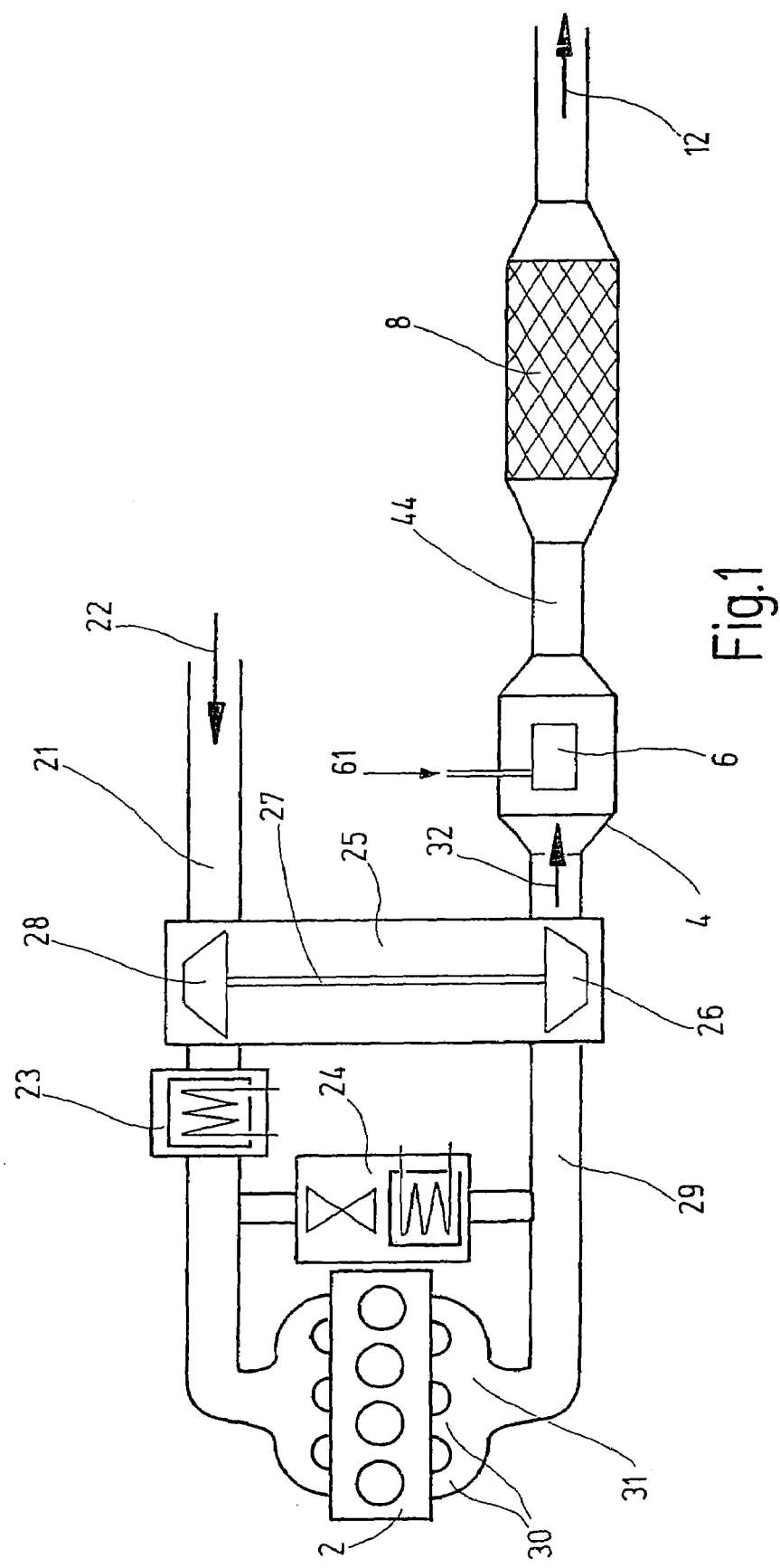
FIG. 1, a schematic illustration of an internal combustion engine with an exhaust gas posttreatment unit in an exhaust conduit.

FIG. 1, in a schematic illustration, shows an internal combustion engine 2 with an inlet conduit 21 for delivering fresh gas 22 and with an exhaust conduit 29 with exhaust-gas cleaning elements disposed in it. A charge air cooler 23 is disposed in the inlet conduit 21 but is not absolutely necessary. An optional exhaust-gas recirculation system 24 is also provided between the inlet conduit 21 and the exhaust conduit 29. Finally, the engine has an exhaust-gas turbocharger 25, which has an exhaust gas turbine 26 in the exhaust conduit that is coupled, via a shaft 27, with a compressor 28 in the inlet conduit 21. An outlet of each combustion chamber of the engine 2 has an outlet conduit 30, and these conduits are joined together to form the common exhaust conduit 29 in a downstream manifold or collector 31.

Figure 6:
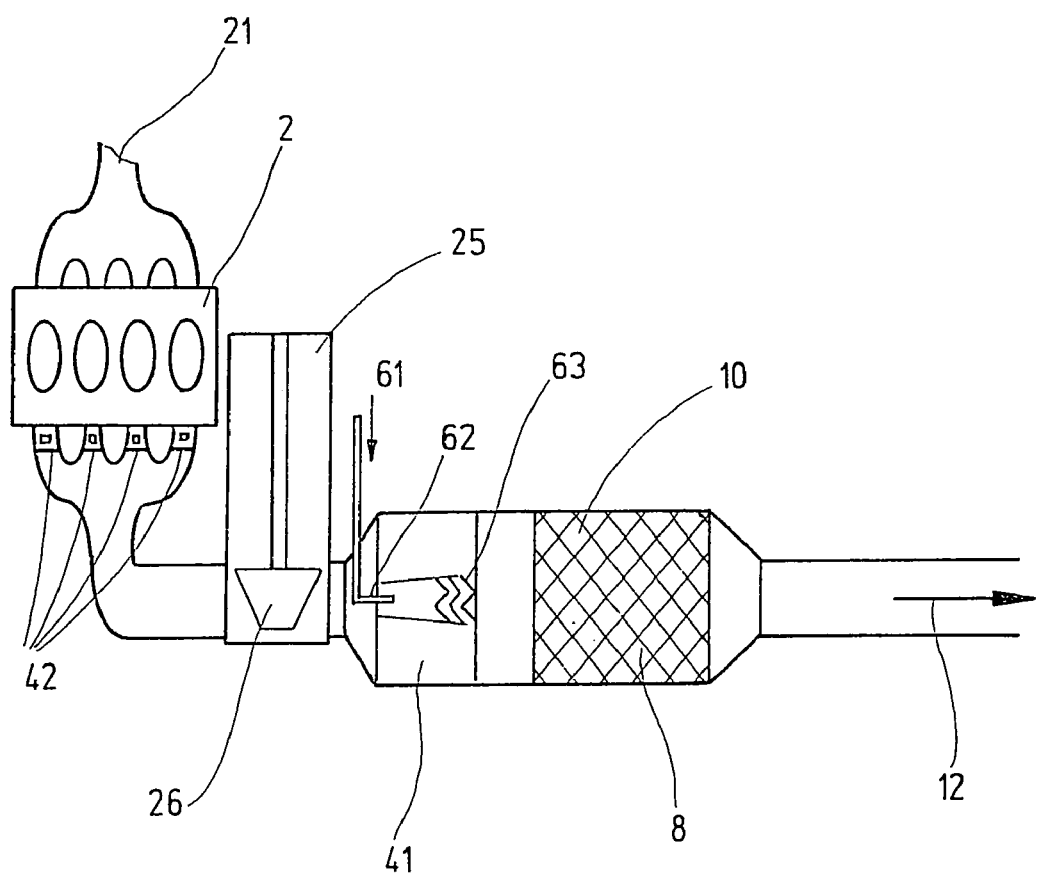

Downstream of the exhaust gas turbine 26 in the exhaust conduit 29, an oxidizing catalytic converter 4 is provided, which is followed by a selective catalytic reduction device 8. This device for selective catalytic reduction will hereinafter also be called an SCR catalytic converter. Between the oxidizing catalytic converter 4 and the SCR catalytic converter 8, a connecting tube 44 is provided, which may optionally be omitted (see FIG. 6), so that the oxidizing catalytic converter 4 and the SCR catalytic converter 8 may be accommodated in a common housing. An exhaust-gas stream 32 laden with pollutants leaves the SCR catalytic converter in the form of largely cleaned exhaust gas 12; it then passes through a muffler, preferably, and downstream of that is carried out into the open air.

The arrangement shown, comprising the oxidizing catalytic converter 4 and the SCR catalytic converter 8, is sometimes called a VR system, in which the "V" represents a precatalytic converter and the "R" stands for the SCR catalytic converter. In the precatalytic converter or oxidizing catalytic converter, the following oxidation reaction takes place:

$$NO + \tfrac{1}{2}O_2 \rightarrow NO_2.$$

The SCR catalytic converter may optionally be preceded by a urea decomposition catalytic converter ("H"), in which the following reaction takes place:

$$(NH_2)_2CO + H_2O \rightarrow 2NH_3 + CO_2.$$

In the SCR catalytic converter ("R") itself, the following selective catalytic reduction reaction takes place:

$$2NH_3 + NO + NO_2 \rightarrow 2N_2 + 3H_2O.$$

The SCR catalytic converter can optionally be followed by a further oxidizing catalytic converter ("O"), in which the following reaction takes place:

$$2NH_3 + 3/2O_2 \rightarrow N_2 + 3H_2O.$$

The systems modified by means of an oxidizing catalytic converter are typically called VHRO systems, naming the individual components in their order. The use of the "H" catalytic converter, which is intended to speed up the decomposition of the added urea, should be considered optional, since this task can be taken on by the SCR catalytic converter. The use of the oxidizing catalytic converter ("O"), functioning as an NH₃ barrier catalytic converter, downstream of the SCR catalytic converter is optional as well. In the present context, the invention is described in terms of the simplified VR system, which can selectively be supplemented with the aforementioned components to make a VHRO system.

In the oxidizing catalytic converter 4, a delivery device 6 is provided for delivering reducing agent 61 into the exhaust-gas stream 32; this device will now be described in further detail in conjunction with FIGS. 2 through 6.

Figure 2:
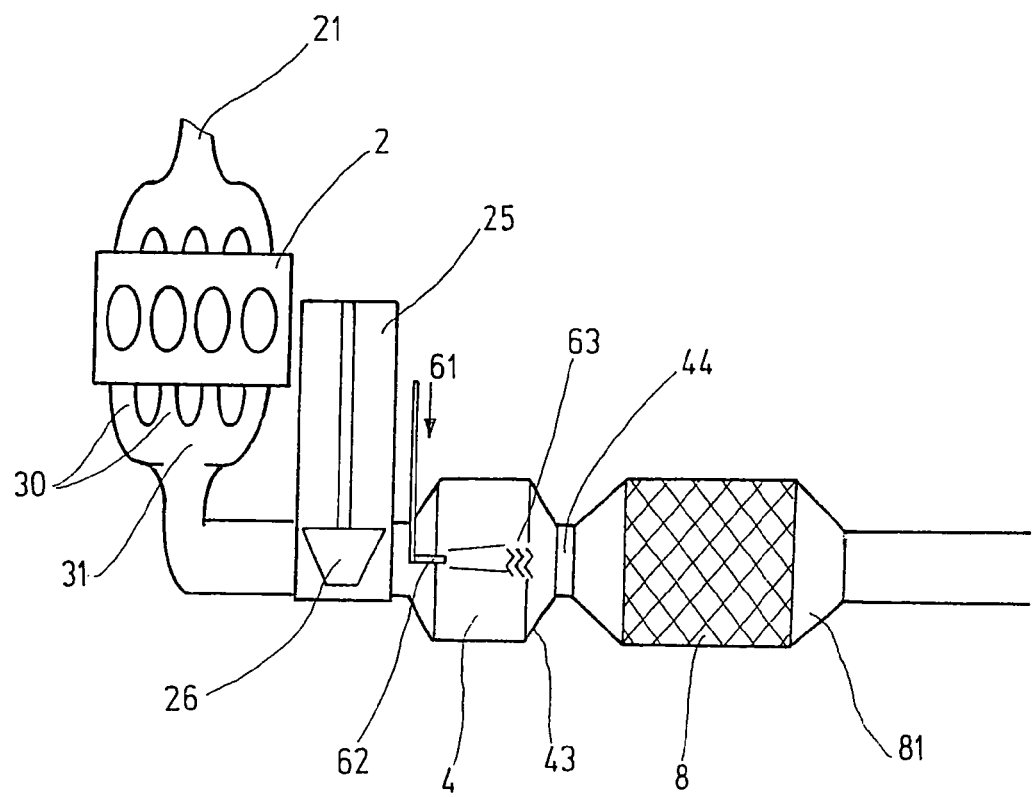
FIGS. 2 through 6, various exemplary embodiments of the exhaust-gas cleaning system of the invention.

FIG. 2 shows a first exemplary embodiment of the exhaust-gas cleaning system of the invention, in which a nozzle 62 is disposed in an approximately central position in the oxidizing catalytic converter 4; by means of this nozzle, the reducing agent 61 is atomized into the oxidizing catalytic converter 4 and added in this way to the exhaust-gas stream 32. Downstream of the nozzle 62, in the spray cone of the nozzle or slightly after it, a mixing device 63 may be provided, but this may selectively be omitted instead. After they pass through a connecting tube 44, the exhaust gases enter the SCR catalytic converter 8, in which a conversion of the nitrogen oxides into molecular nitrogen is performed, with the addition of NH₃ and water.

Figure 3:
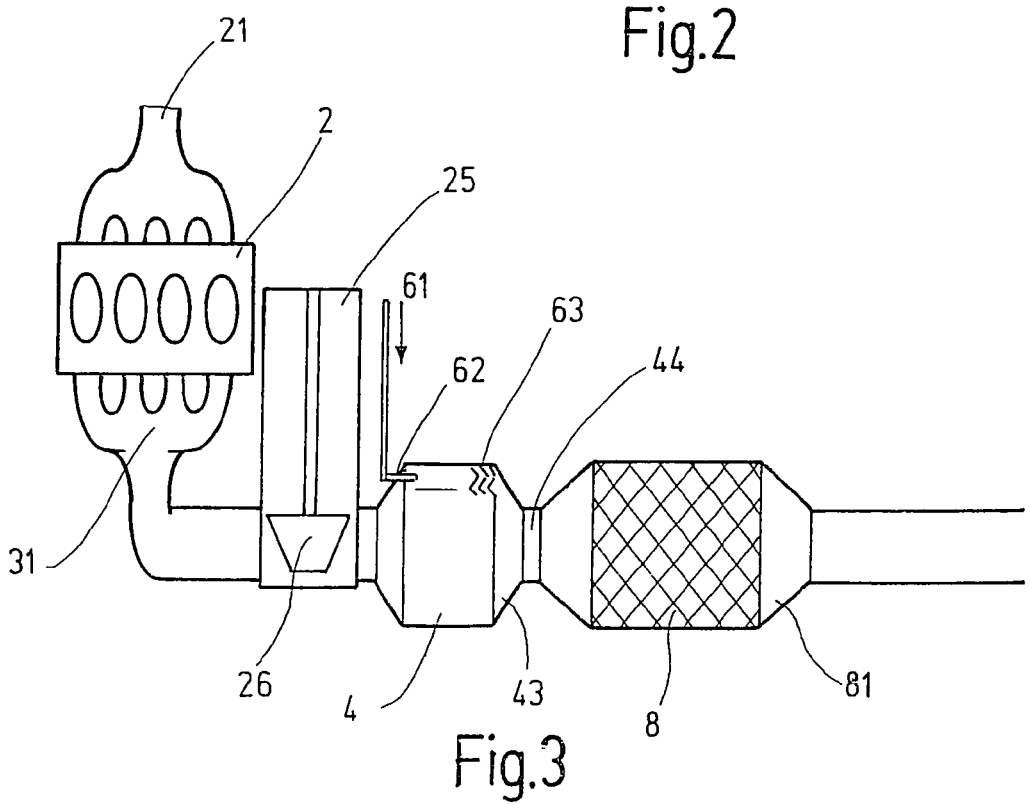

FIG. 3 shows an alternative embodiment of the disposition of the nozzle 62, in this case located eccentrically in the oxidizing catalytic converter 4. The mixing device 63 is likewise located eccentrically in the oxidizing catalytic converter 4, so that very thorough mixing of the reducing agent 61 in the exhaust-gas stream 32 can be effected.

Figure 4:
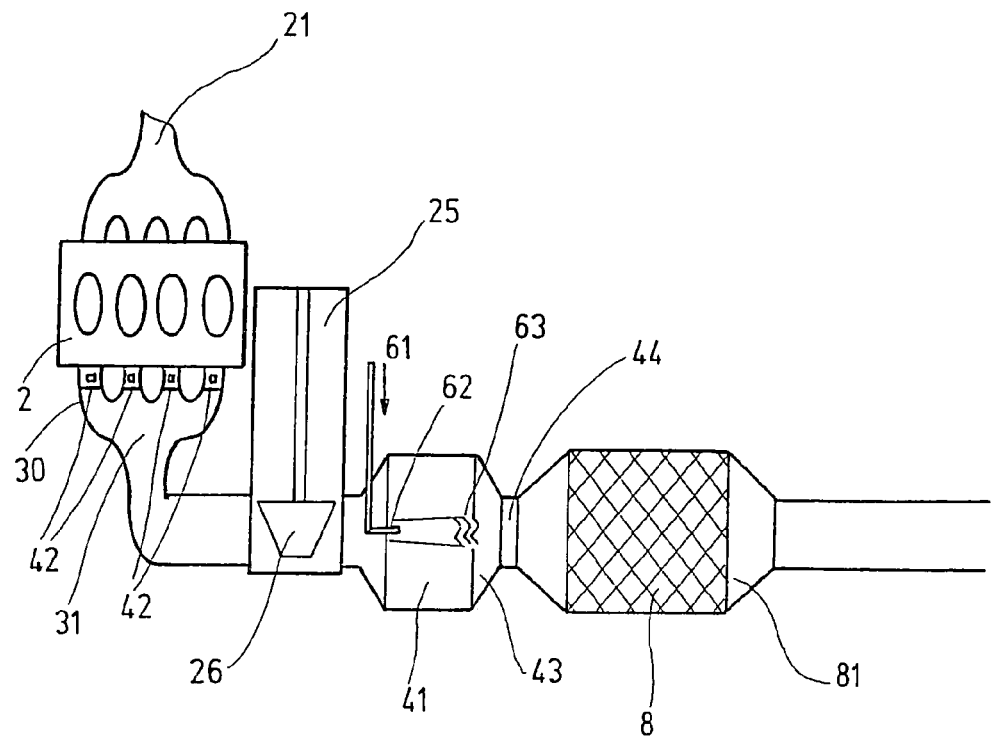

FIG. 4 shows a further alternative embodiment of the exhaust-gas cleaning system of the invention, in which individual oxidizing catalytic converters, here called second oxidizing catalytic converters 42, are disposed, one in each of the outlet conduits 30 of the engine 2. These second oxidizing catalytic converters 42 are known as so-called cylinder-head or preturbocharger catalytic converters and assure that the SCR catalytic converter 8 is largely protected against becoming coated with hydrocarbons and carbon monoxide. The disposition of the delivery device 6 with the nozzle 62 disposed centrally in the first oxidizing catalytic converter 41, is largely equivalent to the embodiment of FIG. 2.

Figure 5:
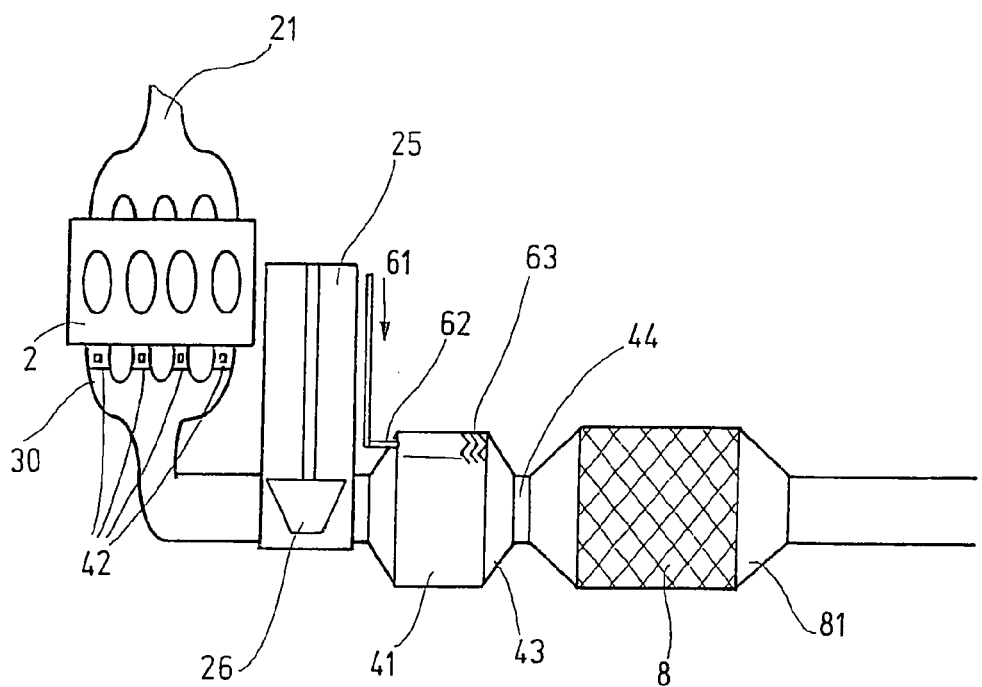

FIG. 5 shows an arrangement, comparable to what is provided in the exemplary embodiment of FIG. 4, of the second oxidizing catalytic converters 42 in the outlet conduits 30. Both the eccentric disposition of the delivery device 6 with the nozzle 62 and the optional mixing device are equivalent to the embodiment of FIG. 3.

In the exemplary embodiments of FIGS. 1 through 5, the first oxidizing catalytic converter 4 or 41, as applicable, is disposed in each case in a housing 43, which is separated from a housing 81 of the SCR catalytic converter 8 by a connecting tube 44. The embodiment of the exhaust-gas cleaning system in FIG. 6 has an integrated housing 10, in which the SCR catalytic converter 8 is disposed along the exhaust-gas stream of the first oxidizing catalytic converter 41 and downstream of that oxidizing catalytic converter. This kind of structure leads to an extremely compact exhaust-gas cleaning system, which furthermore accomplishes very effective exhaust-gas cleaning, since because the connecting tube is omitted the exhaust gases remain at a high temperature level. The second oxidizing catalytic converters in the outlet conduits 30 of the engine may selectively also be omitted (see FIGS. 2 and 3) in this exemplary embodiment having the integrated housing 10.

The foregoing relates to preferred exemplary embodiments of the invention, it being understood that other variants and embodiments thereof are possible within the spirit and scope of the invention, the latter being defined by the appended claims.

The invention claimed is:

1. A method for cleaning exhaust gases of an internal combustion engine with at least one of self ignition and direct fuel injection, the method comprising passing an exhaust-gas stream through at least one oxidizing catalytic converter disposed in the exhaust conduit and through at least one device, downstream of the oxidizing catalytic converter, for selective catalytic reduction, and delivering a reducing agent to the exhaust-gas stream inside the at least one oxidizing catalytic converter, the delivery being effected inside the oxidation catalytic converter whereby the reducing agent can reach the exhaust gas stream via a recess or a drilled-out opening in the oxidation catalytic converter without coming into contact with the oxidation catalytic converter.

2. The method of claim 1, comprising utilizing a nozzle to effect by at least one of a delivery and atomization of the reducing agent.

3. The method of claim 1, wherein the reducing agent is delivered approximately centrally inside the oxidizing catalytic converter.

4. The method of claim 1, wherein the reducing agent is delivered eccentrically inside the oxidizing catalytic converter.

5. The method of claim 1, wherein the exhaust-gas stream is carried through at least one further oxidizing catalytic converter upstream of the first oxidizing catalytic converter.

6. The method of claim 1, wherein the exhaust-gas stream is carried through at least one further oxidizing catalytic converter each in each exhaust conduit immediately downstream of the combustion chambers of the engine.

7. An exhaust-gas cleaning system for cleaning the exhaust gas of an internal combustion engine with at least one of self ignition and direct fuel injection, the system comprising at least one oxidizing catalytic converter, disposed in an exhaust conduit of the engine, at least one device, disposed downstream of the oxidizing catalytic converter for the selective catalytic reduction of the exhaust gases, and a delivery device, integrated with the at least one oxidizing catalytic converter, for delivering a reducing agent into the exhaust-gas stream of the engine, the delivery device including a recess or a drilled-out opening in the oxidation catalytic converter whereby the reducing agent can reach the exhaust stream without coming into contact with the oxidation catalytic converter.

8. The exhaust-gas cleaning system of claim 7, wherein the at least one oxidizing catalytic converter, with the delivery device integrated with it, comprises a first housing; and wherein the device for selective catalytic reduction comprises a second housing adjoining the first.

9. The exhaust-gas cleaning system of claim 7, wherein the at least one oxidizing catalytic converter and the device for selective catalytic reduction have a common housing.

10. The exhaust-gas cleaning system of claim 7, wherein the delivery device comprises a nozzle for atomizing the reducing agent.

11. The exhaust-gas cleaning system of claim 10, further comprising a mixing device, downstream of the delivery device, for distributing the reducing agent in the exhaust-gas stream.

12. The exhaust-gas cleaning system of claim 10, wherein an outlet of the nozzle is disposed approximately centrally in the oxidizing catalytic converter.

13. The exhaust-gas cleaning system of claim 10, wherein the outlet of the nozzle is disposed in an outer peripheral region of the oxidizing catalytic converter.

14. The exhaust-gas cleaning system of claim 7, further comprising by a mixing device, downstream of the delivery device, for distributing the reducing agent in the exhaust-gas stream.

15. The exhaust-gas cleaning system of claim 14, wherein an outlet of the nozzle is disposed approximately centrally in the oxidizing catalytic converter.

16. The exhaust-gas cleaning system of claim 14, wherein the outlet of the nozzle is disposed in an outer peripheral region of the oxidizing catalytic converter.

17. The exhaust-gas cleaning system of claim 14, wherein the at least one oxidizing catalytic converter and the device for selective catalytic reduction have a common housing.

18. The exhaust-gas cleaning system of claim 7, further comprising at least one further oxidizing catalytic converter disposed upstream of the at least one oxidizing catalytic converter in the exhaust-gas stream of the engine.

19. The exhaust-gas cleaning system of claim 18, wherein the at least one further oxidizing catalytic converter is disposed in the immediate vicinity of the combustion chambers of the engine.

20. The exhaust-gas cleaning system of claim 18, wherein the at least one further oxidizing catalytic converter comprises one further oxidizing catalytic converter each on each exhaust gas outlet from each combustion chamber of the engine.

* * * * *